United States Patent [19]

Questel et al.

[11] Patent Number: 5,280,052
[45] Date of Patent: Jan. 18, 1994

[54] PLASTIC MOLDED PIECES HAVING THE APPEARANCE OF A SOLID METALLIC PIECE

[75] Inventors: Roger Questel, New York, N.Y.; Martin Epstein, Andover, Mass.

[73] Assignee: Intaglio Ltd., New York, N.Y.

[21] Appl. No.: 959,066

[22] Filed: Oct. 9, 1992

Related U.S. Application Data

[60] Division of Ser. No. 677,616, Mar. 27, 1991, Pat. No. 5,177,124, which is a continuation-in-part of Ser. No. 594,084, Oct. 9, 1990, abandoned, which is a continuation-in-part of Ser. No. 86,978, Aug. 19, 1987, abandoned.

[51] Int. Cl.$^5$ .................. C08J 9/32; C08K 3/08; B32B 3/14; B32B 5/16
[52] U.S. Cl. .................. 523/219; 523/218; 524/439; 524/440; 524/441; 428/44; 428/49; 428/325; 428/327; 428/328
[58] Field of Search .................. 428/44, 47, 325, 327, 428/328; 523/218, 219; 524/439, 440, 441

[56] References Cited

U.S. PATENT DOCUMENTS

| | | | |
|---|---|---|---|
| 2,145,068 | 1/1939 | Batcheller | 428/49 |
| 2,168,331 | 8/1939 | Fields et al. | 428/364 |
| 2,265,226 | 11/1941 | Clewell et al. | 526/111 |
| 2,454,910 | 11/1948 | Carr | 264/112 |
| 2,773,287 | 12/1956 | Stout | 428/331 |
| 3,010,158 | 11/1961 | Broderson | 264/71 |
| 3,219,734 | 11/1965 | Mattin | 428/332 |
| 3,615,963 | 10/1971 | Johansson et al. | 428/454 |
| 3,870,775 | 3/1975 | Castro et al. | 264/53 |
| 4,521,475 | 5/1985 | Riccio et al. | 428/325 |
| 4,568,586 | 2/1986 | Gobrecht | 428/49 |

FOREIGN PATENT DOCUMENTS

| | | |
|---|---|---|
| 3120831 | 12/1982 | Fed. Rep. of Germany . |
| 2103495 | 6/1972 | France . |
| 2426554 | 12/1979 | France . |
| 2564039 | 11/1985 | France . |
| 9006858 | 6/1990 | PCT Int'l Appl. . |
| 0494875 | 9/1970 | Switzerland . |
| 1159809 | 7/1969 | United Kingdom . |
| 1348432 | 3/1974 | United Kingdom . |

OTHER PUBLICATIONS

Japanese Abstract No. JP A 60 133 048, published Jul. 16, 1985.

*Primary Examiner*—Paul R. Michl
*Assistant Examiner*—Peter Szekely
*Attorney, Agent, or Firm*—Curtis, Morris & Safford

[57] ABSTRACT

A utilitarian and/or decorative object and a method for forming the object fabricated mainly of a plastic material, such as polyester, having a metallic outer face which thereby imparts to this object the appearance and/or hand of a like object made entirely of metal. In this technique, a mixture of a liquid monomer, a curing agent therefor, a dispersion of metal particles and floatable particles are poured into a mold for forming the object. The metal particles are permitted to settle in the mold or the mold is centrifuged to cause the metal particles to migrate toward the outer or lower region of the piece and concentrate in this region before the monomer polymerizes and hardens to bind the particles. At the same time the floatable particles, such as glass or ceramic microspheres, rise to the inner or upper region of the piece and concentrate in this region before the monomer polymerizes and upon hardening of the monomer maintains the article in the desired shape without distortion from warping from uneven shrinkage. After removal from the mold, the outer face of the piece is polished and buffed to remove the fine plastic skin from the surface of the metal particles and to polish the exposed metal surface, whereby the resultant plastic piece simulates the appearance of a solid metal piece.

14 Claims, 2 Drawing Sheets

PLASTIC MOLDED PIECES HAVING THE APPEARANCE OF A SOLID METALLIC PIECE

This application is a division of application Ser. No. 07/677,616, filed Mar. 27, 1991 U.S. Pat. No. 5,177,124, which is a continuation-in-part of application Ser. No. 07/594,084, filed Oct. 9, 1990, now abandoned which in turn is a continuation-in-part of application Ser. No. 07/086,978, filed Aug. 19, 1987, now abandoned.

BACKGROUND OF INVENTION

1. Field of Invention

This invention relates generally to the production of utilitarian or decorative objects such as floor and wall tiles, architectural moldings, vases and other three-dimensional pieces formed mainly of plastic materials, such as polyester, having a metallic appearance. The fabricated objects have the appearance of a genuine metal piece such as a bronze object and can be made to have the hand simulating that of the genuine object, that is, a weight significantly greater than the same object when made entirely of a plastic material. When the object is a decorative tile, molding or the like, the object may be fabricated so the outer surface has a metallic surface giving the appearance that the object is made from metal while the inner surface of the object has a roughened ceramic surface, such as a ceramic tile of ceramic molding would have, giving the appearance that the object is made of ceramic and providing a product which acts like a ceramic product in terms of its use and installation characteristics.

2. Background of the Art

One way of imparting a metallic appearance to an object is, of course, to cast that object from the metal. However, casting a three-dimensional object from a metal such as bronze or copper can be a relatively expensive process with the result that decorative objects such as vases, tiles and the like are not readily available in the mass market to ordinary consumers.

Alloys such as bronze were used in very early times for forming many objects and, therefore, bronze affords a record of ancient life and the arts. The early Egyptians cast and hammered bronze into utensils, armor and statuary, as did the early Greeks and Romans. These pieces were often polished to provide highly reflective and beautiful surfaces which render the pieces greatly prized in the modern art market. However, the cost of fabricating a vase or other decorative piece of bronze or other decorative metal is relatively high, and such pieces are not available in the mass market to ordinary consumers.

Attempts have been made in the past to impart a bronze-like appearance to decorative or utilitarian objects. However, these objects generally do not have the appearance of a genuine bronze or a metallic body. U.S. Pat. No. 2,454,910 discloses a molding technique in which the surface of the mold is coated with a bronzing liquid wherein bronze particles are dispersed in a resin base to create a bronze-like layer in the mold which is then filled with a moldable plastic material such as a phenolic.

Ceramic objects such as floor and wall tiles have been glazed with a coating of metallized enamel and it is also possible to create a thin metallized surface by vacuum deposition, sputtering or other plating techniques on the face of a plastic body.

U.S. Pat. No. 3,615,963 discloses a technique for producing a reinforced panel by spreading out on a stainless steel base treated with a release agent, a mixture of a liquid resinous binder and solid particles of sand or metal powder, these particles settling out to concentrate in the region adjacent the base plate.

In U.S. Pat. No. 2,773,287 a reinforced plastic pipe is disclosed in which glass fibers, crushed rock or other non-metallic particles are mixed with a polyester resin and added to a pipe mold which is then rotated to produce a centrifugal force causing the particles to migrate toward the outer surface of the tube.

Throughout the specification, the terms "hand" and "appearance" are utilized in describing the invention.

The term "hand" refers to the tactile reaction of an individual handling an object. Thus, when an individual has a polished bronze piece in his hand, what he feels is the cold metal. He may also feel the sensation of weight. If instead of a genuine bronze piece the individual is given an identical piece made of plastic with a bronze-enamel facing, then what he senses is the relatively warm plastic material and a much lighter weight.

The term "appearance" refers to the visual impression made by a piece. Using the same example, what the individual will see in a genuine bronze piece is a distinctive bronze glow. However, when confronted by the piece having a shining bronze-enamel facing, he will perceive an obvious imitation, not an authentic bronze.

The term "hand" and "appearance" are interrelated. If an object, though made of plastic, looks like it were made of metal and has a weight significantly greater than one would expect a plastic object to weigh, then the holder of this object, who is subjected to both impressions, thinks he is holding a metal object. Most individuals are normally sensitive only to gross differences in weight. If a piece in the hands of an individual weighs more than plastic and looks like the genuine metal, then the holder receives the impression that the piece is made of metal even if it is not as heavy as pure metal.

While the invention will be described in connection with plastic pieces having bronze particles incorporated therein, it is to be understood that it is not limited to this alloy and is applicable to other metals which are inherently decorative when polished, such as aluminum, brass, copper, nickel-silver (pewter), and other metals.

SUMMARY

An object of this invention is to provide decorative or utilitarian pieces such as tiles, architectural moldings and vases which are cast or otherwise fabricated mainly of a plastic material, yet have an appearance that substantially corresponds to like pieces made entirely of metal and, if desired, a hand like a piece made of the metal.

Another object of this invention is to provide a method for fabricating these pieces which are composed of plastic material, metallic particles and floatable particles.

Also an object of the invention is to provide pieces which incorporate in the composite a fire retardant agent, or other additives so that when the pieces take the form of floor or wall tiles, or other pieces used in building construction, the pieces satisfy stringent architectural, structural and fire code requirements.

Yet another object of the invention is to provide a method which lends itself to mass production at relatively low cost to fabricate these pieces.

A further object of the invention is to provide pieces composed of polymeric plastic and metal particles and also includes an element suspended in the plastic such as floatable particles made of, for example, ceramic or glass microspheres to prevent the object from warping due to uneven shrinkage during the curing of the monomer used to form the objects.

It is an additional object of the invention to produce an object having a metallic appearance which is not formed by layering the metal onto another separate surface but is formed in a process in which the metal containing surface is integral with resin layer below it since both layers are formed from a single resin mixture and bound together by that resin mixture.

Furthermore, it is an object of the invention to produce objects such as tile, moldings and trim which have a metallic outer surface giving the appearance on the outer surface that the object is made of metal and which have a ceramic inner surface leaving the impression from the inner surface that the product is made of ceramic.

Briefly stated, these objects are attained in a process for forming a utilitarian or decorative object fabricated mainly of polyester plastic material, yet having the appearance of genuine metal on the outer face, thereby imparting to this object the hand and appearance of an equivalent object made entirely of metal. In this technique, a mixture of a liquid plastic monomer, a curing agent therefor, a dispersion of metal particles which are more dense than the liquid monomer, and a dispersion of floatable particle which are less dense than the liquid monomer, are poured into a mold for forming the object. The metal particles are permitted to settle in the mold to the lower region of the piece or the mold is centrifuged to cause the metal particles to migrate toward the outer region of the piece and concentrate in this region before the monomer polymerizes and hardens to bind the metal particles. The floatable particles will rise to the upper or inner surface of the object before the monomer cures. As the liquid monomer cures and shrinks, the presence of the metallic particles at one surface of the object and the floatable particles at the opposing surface of the object ensures that the monomer will shrink evenly and maintain the desired shape of the object. Any shrinkage in the object will be balanced on opposing surfaces of the object so it will not lose its desired shape due to uneven shrinkage of opposite faces which would occur if the object contained only the metal particles on one face of the object. For instance, a planar object such as a tile will be substantially flat and free from warping. After removal from the mold, the outer face of the piece is polished to remove the fine polymer skin from the surface of the metal particles and to buff the exposed metal surface. The resultant composite piece which simulates a solid metal piece can be treated in terms of utility, buffing and cleaning like a solid metal piece.

If the floatable particles are made of a ceramic material, such as hollow ceramic spheres, the inner surface of the object, such as tile, molding or the like, may be abraded so as to provide a roughened ceramic surface. The inner surface of the resulting piece has the characteristics of a ceramic piece in appearance and workability.

BRIEF DESCRIPTION OF DRAWINGS

For a better understanding of the invention, reference is made to the following detailed description to be read in conjunction with the accompanying drawings which contain.

DESCRIPTION OF THE INVENTION

Figure 1:
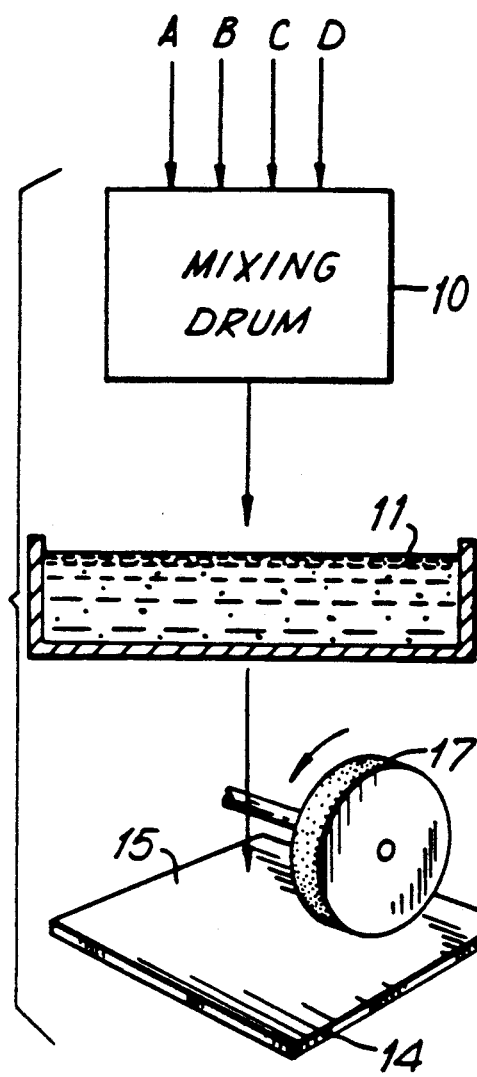
FIG. 1 is a schematic diagram of a method for fabricating a floor tile in accordance with the invention.

Referring now to FIG. 1, the first step in manufacturing an object such as a floor or wall tile in accordance with the invention is to produce a moldable mixture in a mixing drum 10 or other mixing device into which is fed the main constituents of the resin mixture.

The first constituent is a liquid monomer A of a resin, the second is a catalyst or curing agent B to cause the monomer to polymerize and harden at a predetermined rate, the third is fine metal particles C and the fourth is fine floatable particles D. Generally, the curing agent is not added until the monomer and the metal and floatable particles are thoroughly intermixed and are about to enter the mold. Otherwise, curing will take place prematurely in the mixing drum. Furthermore, the amount of floatable particles should be about equal in volume, not necessarily in weight, to the amount of the metal particles to adequately balance the shrinkage rates of the opposing sides. The volume of floatable particles may vary depending on the type of floatable particles, metal and monomer utilized. In any event, the volume of floatable particles used should be an amount sufficient to ensure balanced shrinkage of the monomer so the object maintains its desired shape.

Typical weight ratios of the constituents are 30 to 300 parts of metal particles, 2 to 6 parts of floatable particles, 1 to 2 parts of curing agent and 2 to 10 parts of other components or additives to 100 parts of monomer.

The metals which may be utilized in the invention are those which would produce a decorative effect such as powders of bronze, pewter, copper, brass or aluminum. Particle size should be small enough so that the appearance of the object will be that of solid metal but large enough and of sufficient density so the metal particle will sink in the liquid monomer to one surface of the object. Typically, particles in the range of about 100 to about 325 Taylor mesh, preferably about 200 to about 300 Taylor mesh and most preferably about 200 Taylor mesh, will be satisfactory. However, coarser particles may be used to impart to the piece a different appearance.

Various monomers can be used in the process especially unsaturated polyesters, acrylates, methacrylates, styrenes, methylstyrenes, epoxies, allyls and diallylphthalates.

Specific examples of preferred plastic are Polylite 32-358, an unsaturated polyester resin monomer manufactured by Reichhold Chemicals, Inc. and containing more than 50% unsaturated polyester resin and less than 50% styrene monomer; Aropol 8520-14 an unsaturated polyester resin manufactured by Ashland Chemical, Inc. and containing 65 to 70% by weight unsaturated resin and about 30% by weight styrene; Envirez 5310, another unsaturated polyester resin manufactured by Ashland and containing 50 to 55% polyester resin, 25 to 30% ethylene glycol dimethacrylate and 15 to 20% hydroxethyl methacrylate; and Hetron FR 992, an epoxy-acrylate resin manufactured by Ashland and containing about 36% styrene.

The floatable particles are powders, microspheres or other particles which have a density which is less than the density of the plastic monomer so that a substantial portion of the floatable particles, will migrate in the liquid monomer to the inner surface or the surface of the object opposite the surface containing the metal particles. The fact that the floatable particles float also ensures that they will not migrate to and mark the metallic surface of the object. The amount of floatable particles which migrate to the surface should be about equal in volume to the amount of metal particles migrating to the opposing surface. The floatable particles may be in the form of powder such as polyethylene or polypropylene, or hollow microspheres made of, for example, ceramic or glass.

Factors such as viscosity of the monomer, production time and other production requirements, gel time (curing time), and the type of floatable particles will effect the amount of the floatable particles which migrate to the surface of the object. However, the process should be controlled to ensure even shrinkage of the monomer during curing. These same factors will affect the amount of the metal particle which reach the opposing surface of the object.

Specific examples of floatable particles are the following products manufactured by PQ Corporation of Valley Forge, Pa.: Extendospheres SG, hollow ceramic microspheres containing up to 5% crystalline silica; Extendospheres SL, hollow aluminum silicate microspheres; Q-cell 300 inorganic sodium borosilicate microspheres containing amorphous silicon dioxide; Extendospheres XOL 50 or XOL 200 Bubblekup, organosilicon modified aluminum silicate microspheres; and Metalite ceramic microspheres coated with aluminum, copper or zinc. However, this is not intended to limit the types of materials which can be used as floatable particles, particularly in larger objects such as table tops where larger floatable particles can be used.

The curing component can be any suitable catalyst used for curing monomers such as methyl ethyl ketone peroxide.

As to the additive utilized, the promoter helps promote curing at room temperature. The curing time, which may be extended to as much as 30 minutes, can be adjusted by adding to the mixture an appropriate small amount of Aropol Q 6919 inhibitor. The curing time depends on the ratio of promoter, catalyst and inhibitor added to the mixture. A fire retardant agent, such as aluminum trihydrate (ATH), is optional and in the case of vases or other objects in which fire retardation is not a necessary property, ATH may be omitted. Sunscreens are utilized to protect objects from the deleterious effects of ultraviolet light. Colorants may be added to modify the final color of the object and the resin and sealing wax solution are added to seal the plastic during curing.

Figure 2:
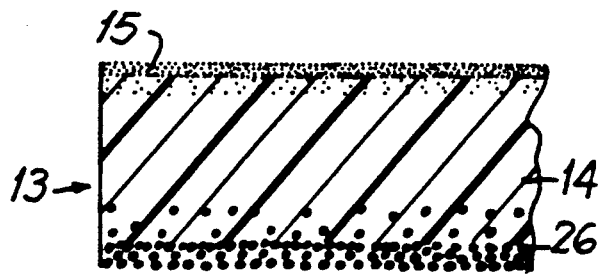
FIG. 2 is a section taken through the resultant tile.

After thorough mixing in the drum to cause the metal particles and the floatable particles to become uniformly dispersed in the resin mixture, the resin mixture 11 is poured into a mold 12 having a form appropriate to the object, in this case a tile. Uniform dispersion of the metal and floatable particles in the resin mixture produces objects, particularly planar objects, which have a metal surface of substantially uniform thickness. The thickness of the metal surface required will depend upon the use and desired weight of the final object. For instance, a bronze metal surface formed by the concentrated mass of metal particles may be about 0.30 mm to about 1.0 mm thick for a tile which is 3.2 mm (one-eighth of an inch) in thickness, whereas a counter top surface may have an 0.8 to 2.0 mm thick metal surface. The hardening time of the mixture is such as to permit the relatively heavy particles C to settle by gravity and concentrate in the lower region of the mold and for the relatively light floatable particles to migrate to the upper region of the mold. Vibration of the mold 12 will assist the movement of the metal and floatable particles to the appropriate regions. When the mixture hardens, a tile 13 is produced which, as shown in FIG. 2, has a body formed of plastic material 14 and an outer face region 15 defined by a dense mass of metal particles embedded in plastic which act to bind the metal particles together and an inner face region 26 made up of a mass of floatable particles embedded in the plastic which also binds the floatable particles together. The outer face region 15, the body of plastic material 14 and the inner face region 26 are all bound together integrally by the same cured resin. In the case of a tile or other planar object, the molding procedure ensures a substantially planar form free of any warping due to uneven shrinkage which would cause the planar object to lose its desired shape. The integral nature of the object is important because it helps to prevent surface chipping which could occur if a plastic substrate is merely coated with metal.

The tile 13, after hardening is completed, is removed from mold 12. At this point, the outer face 15 of tile 13 contains a thin plastic skin covering the metal particles. In order to impart the appearance of the metal to the object, the thin plastic skin is abraded or polished away to expose the metal. At a finishing station 16, outer face 15 of the tile is polished and buffed by any suitable polishing means such as a buffing wheel 17 to remove the plastic binder skin and expose the particles at the face to a polishing action to produce a polished metal.

Typical buffing and polishing compounds utilized are products sold by the Lea Manufacturing Company of Waterbury, Conn. for fine, medium and heavy cuts. For fine cuts (color), a mix of abrasive, fatty acids and glycerides containing about 5% to 15 chrome (III) oxide and 70 to 80% aluminum oxide may be used. Medium cuts (cut and color) are obtained using a mixture of abrasive, fatty acids, glycerides, petroleum wax/oils and soap containing 1 to 5% ethanol 2,2-iminodi- and 67 to 80% silica dust. A heavy cut (cut down) results from the use of a mix of abrasive, fatty acids, glycerides and petroleum wax/oil containing 10 to 35% silica dust and 38 to 60% tripoli dust. There are a wide range of other products available for metal finishing.

The face of the object may be treated in a variety of ways such as applying salt water to impart a patina. To protect the finish, a thin, transparent, adherent plastic coating may be applied such as urethane, wax or other compatible coating. Alternatively, the exposed face may be permitted to age in an oxidizing atmosphere so as to acquire the tarnish or natural patina of the natural metal.

The weight of the resultant composite tile, though not as heavy as a tile made entirely of metal, may be significantly greater than the same tile made entirely of plastic material depending on the amount of metal particles. The tile will therefore have the "hand" of a tile seemingly made of lightweight metal, not that of a tile made of plastic material.

In the case of fine bronze particles, the weight of bronze particles is more than three times greater than a load of the same volume of polyester resin. Though in terms of volume, the plastic is the main constituent, in terms of weight the object may be at least about 50% heavier than the same object made entirely of plastic and may even be twice as heavy. In such an embodiment, the object will have a "hand" approaching that of a metal object.

EXAMPLE 1

A resin mixture was formed from the following:
100 grams of polyester resin (Reichhold Polylite Polyester Resin 32-358)
100 grams of metal particles (Bronze Powder B-406, United States Bronze Powders, Inc.)
1.0 grams of catalyst (Whitco Hi-Point 90 MEKP, Argus-U.S. Peroxygen Products)
2.5 grams of microspheres (Extendospheres SG Hollow Microspheres, PQ Corporation)
3.0 grams of wax styrene solution (sealant) (Modifier C, Aristech Chemical Corp.)

A planar tile formed from this formulation will be flat with no warping. The amount of metal may be varied from about 30 to 100 grams or even up to 500 grams depending on the desired weight of the object and the desired thickness of the metal layer. The amount of the floatable particles would likewise be varied by volume.

EXAMPLE 2

A resin mixture was formed from:
80 grams of polyester (Envirez 5310, Ashland Chemical Inc.)
60 grams of flame retardant, alumina trihydrate (RSB 431 Hydrated Alumina, Salem Industries)
40 grams of metal particles (Bronze Powder B-406, United States Bronze Powders, Inc.)
2.4 grams of promoter (Envirez 59016 Accelerator Solution, Ashland Chemical Corp.)
1.6 grams of catalyst (Whitco Hi Point 90 MEKP catalyst, Argus-U.S. Peroxygen Products)
2.0 grams of microspheres (Extendospheres SG Hollow Ceramic Microspheres, PQ Corporation)
3.0 grams of wax styrene solution (Modifier C, Aristech Chemical Corp.)

A tile made from the formulation will be flat and free from warping.

COMPARATIVE EXAMPLE

A resin mixture was formed as follows:
100 grams polyester resin (Reichhold Polylite Polyester Resin 32-358)
100 grams of metal particles (Bronze Powder B-406, United States Bronze Powders, Inc.)
1.0 grams of catalyst (Whitco Hi-Point 90 MEKP, Argus U.S. Peroxygen Products)
3.0 grams of wax styrene solution (Modifier C, Aristech Chemical Corp.)

The tile made from this formulation was warped due to uneven shrinkage of the surfaces with and without the metal particles. The surface containing the metal particles did not shrink as much as the surface which did not contain any metal particles during the curing of the resin. The result was that the tile was curved and not flat. Use of the tile would require attaching a backing to the tile which flattened the tile or securing the tile to the surface in a manner which flattened the tile. If the cured resin was not flexible, the tile could not be used.

Figure 3:
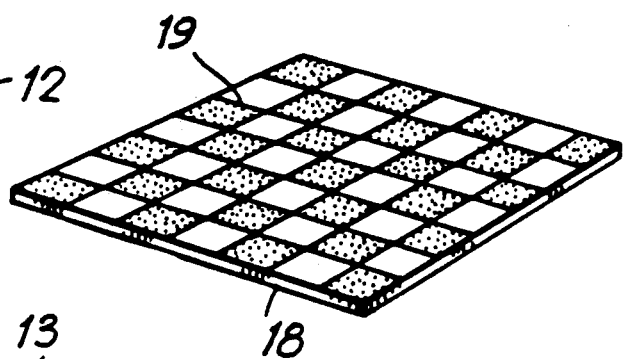
FIG. 3 is a perspective view of a tile in accordance with the invention having a checkerboard face pattern.
Figure 4:
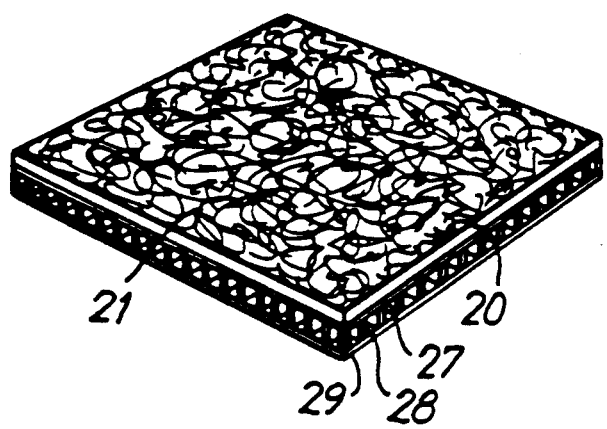
FIG. 4 is a perspective view of a tile in accordance with the invention having an abstract face pattern.

In practicing the invention, the inner surface of the bottom wall of the mold may be embossed, etched or otherwise modified to create a decorative pattern on the face of the resultant object. Thus, as shown by floor tile 18 in FIG. 3, the face 19 has an embossed checkerboard pattern having smooth raised squares and rough depressed squares. This surface is not only decorative, but also provides a tread to prevent slipping when walking. Or, as shown by floor tile 20 in FIG. 4, the face 21 has an abstractly crinkled or fibrous tread surface which is also highly decorative. One could also emboss a logo on the mold to produce tiles having the logo on its face.

Additionally, by formulating a resin mixture in two (or more) parts, the first part having one metal such as bronze, and the second part having another metal such as brass, objects may be made which give the appearance of being cast from more than one metal. For instance, a pattern along the outer edge of a tile may appear to be brass while a pattern in the inner section of the tile may appear to be bronze.

The advantage of a metal-like tile in accordance with the invention over conventional ceramic tiles is that ceramic tiles are necessarily thicker in order to render them less fragile and therefore heavier than the relatively thin metal-like tile, making it more expensive to ship and store ceramic tiles. Also, the metal-like tiles can be cut without difficulty to conform to space requirements, whereas ceramic tiles are difficult to cut.

Even though objects such as tiles made in accordance with the invention can be produced to be relatively thin, if desired, a backing can be applied to the object so that it is thicker or conforms to a standard size. For example, the bottom of tile 20 shown in FIG. 4 may be provided with a backing of a thin fiberglass sheet 27 covered by an aluminum honeycomb sheet 28 which is then covered by a thin fiberglass netting 29. In this manner, a tile which is one-eighth of an inch thick can be made to be one quarter of an inch thick in order to conform to industry standards.

Figure 5:
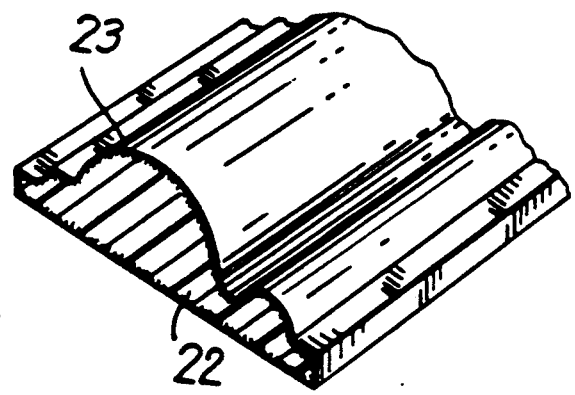
FIG. 5 is a perspective view of an architectural molding in accordance with the invention.

FIG. 5 illustrates a cast architectural molding 22 having a plastic body and a contoured face region 23 formed by bronze or other metal powders such as brass which are held together by a plastic binder, the face being polished so that the molding appears to be made of bronze or whatever other metal is used. Since the molding is mainly of plastic, it may be glued or otherwise attached to a wall in the manner of a wood molding. A solid bronze molding would be too heavy to easily attach to a wall. Such moldings can also be used to create picture frames.

Figure 6:
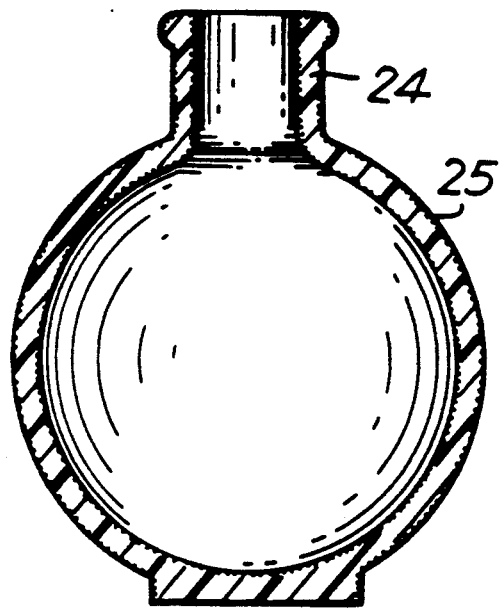
FIG. 6 is a section taken through a vase in accordance with the invention.

In the vase 24 shown in FIG. 6, the metallic face region 25 is formed by rotating the mold containing the mixture of liquid monomer and metal particles to produce a centrifugal force causing the heavier particles to migrate toward the face region while the lighter particles form a layer on the inner surface before the monomer polymerizes and hardens.

These pieces are by no means the only ones which can be produced using the invention. It is also possible to form many types of products for use inside and outdoors. As examples only and not intended to be an exhaustive list, the invention may be used to form sculptured ornaments, head boards, boxes and other pieces having a hand and appearance simulating all-metal pieces. It can be used for interior products such as wall and floor tiles, counter top surfaces, desk tops, table tops, furniture components, plumbing fixtures, trim, planters, stair railings, decorative brackets, panels, shelves, picture frames and lighting fixtures. In products used outdoors, it may be utilized for doors, roof tiles, gutters, lawn and garden furniture, swimming pool tiles and trim, outer facings of buildings, marine hardware and accessories, automotive body parts and accessories, tools, toys and athletic equipment. By modifying the ingredients of the resin mixture, the object fabricated can be adapted for a particular use. For example, if the object is intended for outdoor use, the resin must be suitable for this purpose.

The relative amount of metal particles included in the mixture for forming the piece depends on the desired final weight of the piece, and in some cases one can use amounts of metal particles which are equal in weight or even up to five times the weight of the polyester to produce relatively heavy pieces and increase the illusion that the piece is made of metal. In the case of a vase, a table lamp base or other three-dimensional objects, the enhanced weight gives stability to the pieces.

Another aspect of the "appearance" factor which comes into play is the impression made by an object according to the invention as contrasted to a similar object having a metallic glaze. The glazed object has a shiny appearance which mitigates against its visual acceptance as being truly metallic in nature, whereas an object according to the invention has a soft metallic glow and in time acquires a natural patina which is lacking in a glazed object.

While the invention as described is an improvement over the art, there are further enhancements which can be made to the products which are particularly well suited for products having a decorative outer surface and a functional inner surface which is intended to be bonded to another surface. Tiles, moldings, trim and the like are examples of these types of products.

The further improvement involves abrading the inner surface of the molded product to remove a thin plastic skin which has formed during the molding process and covers the floatable particles. The abrading also ruptures the floatable particles on the inner surface to expose both the inside and the outside of the floatable particles. Abrading can be carried out in a number of ways including sandblasting or sanding the inner surface of the object. The result is that the inner surface, instead of being smooth, is roughened and slightly irregular. This roughened inner surface provides an improved bonding surface for adhesives, glues and other mastics.

By providing floatable particles which are ceramic microspheres in the molded product and then abrading the inner surface of the product, the inner surface functionally and aesthetically take on the characteristics of a ceramic product. Tiles, moldings and the like may be used in the same manner as ceramic tiles and moldings. For instance, a tile may be produced which is ¼ inch thick which would be compatible with standard ceramic tile thickness in that industry. The ¼ inch thick tile may be produced without any attached backing and can be bonded to a wall, floor, countertop or the like with adhesives well known in the ceramic industry. Elimination of the use of a backing also saves the labor, time and cost of installing the backing on a ¼ inch tile.

Figure 7:
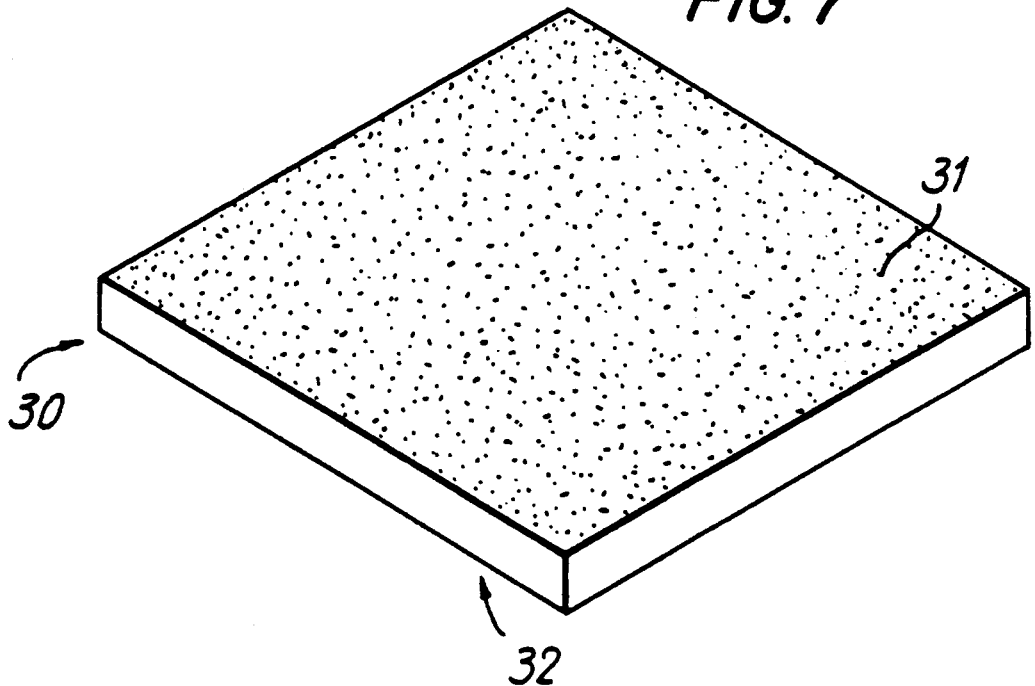
FIG. 7 is a tile in accordance with the invention showing the abraded inner surface of the tile.

Referring to FIG. 7, which depicts a tile made according to this process, the tile 30 has a inner surface 31 and an outer decorative surface 32 (which is not visible in the figure).

The tile 30 is formed in a manner similar to that used to make the object described in connection with FIG. 1. In producing tile 30, a liquid plastic resin, powdered metal, catalyst (or curing agent) and hollow ceramic beads are mixed to form a resin mixture. Other additives such as fire retardants, UV absorbers, promoters and vapor suppressants may be included to enhance the physical properties of the product and to improve the physical handling of the mixture.

Examples of liquid plastic resins are R 0059, a polyester resin manufactured by HK Research Corporation, and Hetron 425 P, a polyester resin manufactured by Ashland Chemicals, Inc. Powered metals such as B-406 Bronze or C-118 Copper produced by U.S. Bronze may be utilized. The catalyst or curing agent may be an organic peroxide catalyst such as Lupersol DDM-9 manufactured by Lucidol Penwalt Corporation or Hi-Point 90 sold by Witco Corporation. The hollow ceramic beads may be, for example, PQ Corporation's Extendospheres SG or Extendospheres SF-12. Promoters such as 6% Cobalt Nap-All or 12% Cobalt Polycure A+ produced by Mooney Chemicals, Inc. may be used to vary the gel, demold and cure times of the product.

The resin mixture is blended in a mixing drum with a mixing device such as a paint stirrer or with more sophisticated metering and mixing equipment.

The content of the metal powder in the resin mixture may be about 15% to about 400% of the weight of the liquid plastic resin and the hollow ceramic bead content may range from about 3% to about 15% of the weight of the metal powders. The amounts of the catalyst and promoter, if used, can be varied to produce longer or shorter gel, demold and cure times. Instead of a hollow ceramic bead, a silica based material such as glass microspheres or other material which would provide a porous surface can be utilized.

The resin mixture is cast in flexible molds which may be made from silicone rubbers or urethane elastomer. Gel times vary from about 5 to about 60 minutes and demold times vary from about 10 to about 180 minutes depending on the amount of catalyst and promoter used. Room temperature cure of the object generally takes between about 48 to about 72 hours. To accelerate the cure, the object may be baked in a low temperature oven for example, for 2 hours at 150° F., to provide a complete cure.

Once the object is completely cured, the object is removed from the mold and the inner side of the object containing the ceramic beads is abraded to remove the thin plastic skin which formed during the molding and to create a rough surface which will facilitate a good mechanical bond using standard tile adhesives. The roughened surface can be obtained by sandblasting for 2 to 3 seconds at 60 psi using 54 grit aluminum oxide abrasive. There are a variety of other sandblast media available in different grits and base materials which will accomplish this same task. The roughened surface has a porous texture which results from the elimination of the thin plastic skin and the rupturing of the microspheres on the inner surface of the object.

Sandblasting is a particularly good method to roughen the ceramic inner surface of the object because it can be used also to mark the inner surface of the object with a logo, name or other design. By covering the inner surface with a rubber or steel mask containing the stencil of the desired mark and then sandblasting the inner surface, the object will contain the imprint of the desired mark (see FIG. 7).

After abrading the inner ceramic surface, the metal surface is buffed to produce the shiny, metallic outer surface. This may be accomplished for example in two steps. The first step involves cutdown buffing in which the outer layer of plastic resin covering the particles on the outer surface of the object is removed, thus exposing the metal and producing a smooth metallic surface. Cutdown buffing may be done with a wide variety of buff styles, base materials, and buffing compounds. For instance, the cutdown buffing may be done with a 12 inch flannel bias buff at 1750 rpms using Learock 857 bar compound from Lea Manufacturing Co., Inc. The second step is called color buffing which produces a high gloss or mirror finish on the metallic outer surface of the object. The 12 inch flannel bias buff at 1750 rpms using Learock 349E bar compound from Lea Manufacturing Co., Inc. will accomplish this task.

After buffing is completed, the buffing compound residue is removed to provide a clean surface for subsequent adhesion of a clear protective coating and to improve and protect the object's aesthetic qualities. Cleaning may be accomplished by a variety of methods including pressure washing and ultrasonic cleaning. Cleaning solutions may be acidic or alkaline. As an example of a cleaning operation, an ultrasonic tank may be filled with a solution of 20 parts water to 1 part cleaner such as Mi-Clean 310 from Mitchell-Bradford International Corp. The object is placed in the tank and cleaned for 30 seconds to 10 minutes depending on the amount of the residue. Once the object is clean, it is rinsed free of cleaning solution residue. Deionized water may be used, since it does not contain the calcium or magnesium normally present in the local water supply, and, hence, leaves the surface free of water spots. The finished object may be air dried if deionized water is used for the rinse.

The clean and dry objects may then be covered with a clear protective coating on the outer decorative surface. The coating prevents the metal surface from tarnishing, and protects it against marring and scratching. Useful as coatings are architectural coatings, powder coatings, enamels, and lacquers. Examples of specific coatings include 202W Baking Lacquer from Agate Lacquer Manufacturing Co., and Hydroshield Plus from the Hydrocoat Company, Inc. Coatings may be applied using conventional spray techniques. One such technique utilizes compressed air in combination with a Model 2001SS spray gun from Binks Manufacturing to coat the outer decorative metallic surface of the object with the baking lacquer. After spraying, the object may be baked in order to accelerate the cure of the coating. Baking temperatures and times range from about 150° F. to about 250° F. and about 5 to about 90 minutes depending on the coating used. An object coated with the 202W baking lacquer typically is baked at about 175° F. for about 45 minutes.

Two examples of the invention including the enhancement described above follow.

EXAMPLE 3

A resin mixture was formed from the following
100 grams of resin (Ashland Chemical Hetron 425 P)
25 grams of metal particles (Bronze Powder B-406, United States Bronze Powders, Inc.)
1.50 grams of catalyst (Witco Hi-Point 90, Witco Corp.)
1.75 grams of hollow ceramic microspheres (Extendospheres SG, PQ Corporation)
0.50 grams of a promoter (6% Cobalt Nap-All, Mooney Chemicals, Inc.)
3.00 grams of a vapor suppressant (Modifier C, Aristech Chemical, Inc.)
5.00 grams of a fire retardant (Nyacol APE1540, Nyacol Products, Inc.)

The inner surface of the ¼ inch planer tile formed from this mixture was sandblasted to expose the roughened ceramic beads. This tile had a shiny decorative metallic outer surface which gave the appearance that the tile was made of metal. The inner surface of the tile functionally performed like a ceramic tile in that it could be bonded to another surface using adhesives known in the ceramic tile industry.

EXAMPLE 4

A resin mixture was formed from
100 grams of unsaturated polyester resin monomer (Polylite 32-358, Reichhold Chemicals, Inc.)
50 grams of powdered metal (C-112 Copper, United States Bronze Powders, Inc.)
2.0 grams of catalyst (Lupersol DDM-9, Lucidol Penwalt Corporation)
2.5 grams of hollow ceramic microspheres (Extendospheres SF-12, PQ Corporation)
1.00 grams of a vapor suppressant (BYKS740, BYK Chemie)

The tile formed from this resin mixture was sandblasted on the inner surface to expose the roughened ceramic beads. Again, the outer decorative surface of the tile was shiny and metallic while the inner surface of the ¼ inch tile functioned like a ceramic tile.

While there has been shown and described preferred embodiments, it will be appreciated that many changes and modifications may be made without departing from the essential spirit of the invention.

We claim:

1. A process for creating a formed object having an outer surface with a metallic appearance and another surface comprising the steps of:
   (a) forming a resin mixture of a liquid monomer resin, a curing agent, metal particles and means for preventing substantial uneven shrinkage of the outer surface and the other surface during curing;
   (b) retaining the resin mixture in a mold adapted to create the form of the object;
   (c) forming a concentrated mass of the metal particles on the outer surface of the object by the migration of the metal particles to the outer surface before curing of the resin mixture;
   (d) locating the means for preventing substantial uneven shrinkage in the resin mixture in the mold prior to curing in the desired orientation;
   (e) curing the resin mixture to create the formed object.

2. The process, as claimed in claim 1, comprising the added step of:
   (f) polishing the outer surface of the object to impart a metallic appearance to the object.

3. A process for creating a formed object having a metallic appearance comprising the steps of
   a) forming a resin mixture of a liquid monomer resin, a curing agent, metal particles and floatable particles, the metal particles having a density greater than that of the liquid monomer resin and the floatable particles having a density less than the density of the liquid monomer resin;

b) pouring the resin mixture into a mold adapted to create the form of the object;

(c) causing the metal particles in the resin mixture to migrate to the outer surface of the object such that the metal particles form a concentrated mass of metal particles on the outer surface of the object before the resin mixture cures;

(d) causing the floatable particles in the resin mixture to migrate to another surface of the object such that the floatable particles form a concentrated mass of floatable particles on the other surface before the resin mixture cures; and (e) curing the resin mixture.

4. The process, as claimed in claim 3, comprising the added step of:

(f) polishing the outer surface of the object to impart a metallic appearance to the object.

5. The process, as claimed in claim 4, in which the amount of the floatable particles in the resin mixture is sufficient to ensure substantially balanced shrinkage of the outer surface and the other surface of the object during curing in order to maintain the desired shape of the object.

6. The process, as claimed in claim 5, in which the volume of floatable particles in the resin mixture is about equal to the volume of metal particles in the resin mixture and the density of the floatable particles is less than the density of the uncured resin.

7. The process, as claimed in claim 6, in which the metal particles are bronze, copper, aluminum, pewter or brass and the floatable particles are ceramic or glass microspheres or polyethylene or polypropylene powder and the liquid monomer is an unsaturated polyester, an acrylate, a methacrylate, a styrene, a methylstyrene, an epoxy, an allyl or a diallylphthalate.

8. A process for creating a formed object having an outer decorative surface and an inner functional surface which is adapted to be bound to another surface comprising the steps of a) forming a resin mixture of a liquid plastic resin, a curing agent, metal particles and floatable particles, the metal particles having a density greater than that of the liquid plastic resin and the floatable particles having a density less than the density of the liquid plastic resin;

b) pouring the resin mixture into a mold adapted to create the form of the object;

c) causing the metal particles in the resin mixture to migrate to the outer decorative surface of the object such that the metal particles form a concentrated mass of metal particles on the outer decorative surface of the object before the resin mixture cures;

d) causing the floatable particles in the resin mixture to migrate to the inner functional surface of the object such that the floatable particles form a concentrated mass of floatable particles on the inner functional surface before the resin mixture cures;

e) curing the resin mixture; and f) abrading the inner functional surface to expose the floatable particles at the inner functional surface.

9. The process, as claimed in claim 8, comprising the added step of:

g) polishing the outer surface of the object to expose the metal particles at the outer decorative surface and to impart a metallic appearance to the object.

10. The process, as claimed in claim 9, in which the amount of the floatable particles in the resin mixture is sufficient to ensure substantially balanced shrinkage of the outer decorative surface and the inner functional surface of the object during curing in order to maintain the desired shape of the object.

11. The process, as claimed in claim 10, in which the metal particles are bronze, copper, aluminum, pewter or brass and the floatable particles are ceramic or glass microspheres and the liquid plastic resin is an unsaturated polyester, an acrylate, a methacrylate, a styrene, a methylstyrene, an epoxy, an allyl or a diallylphthalate.

12. The process, as claimed in claim 11, in which the inner functional surface is abraded to rupture the floatable particles at the inner functional surface to create a surface which has a roughened and porous texture.

13. The process, as claimed in claim 12, in which the floatable particles are ceramic microspheres.

14. The process, as claimed in claim 13, in which the formed object is a tile or molding.

* * * * *